Aug. 11, 1942.          B. W. FRY          2,292,628
COIN SELECTOR
Filed Dec. 4, 1940          5 Sheets-Sheet 1
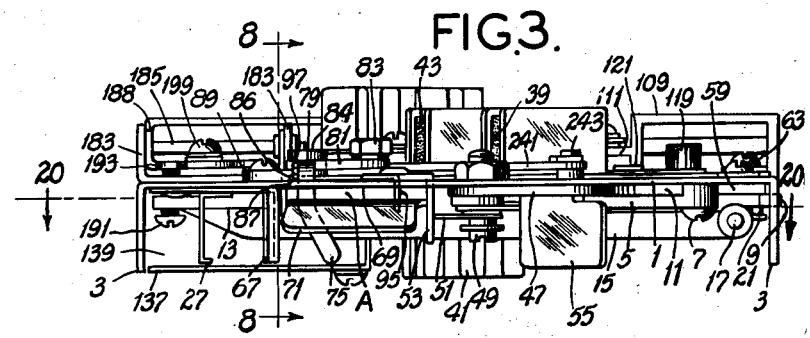
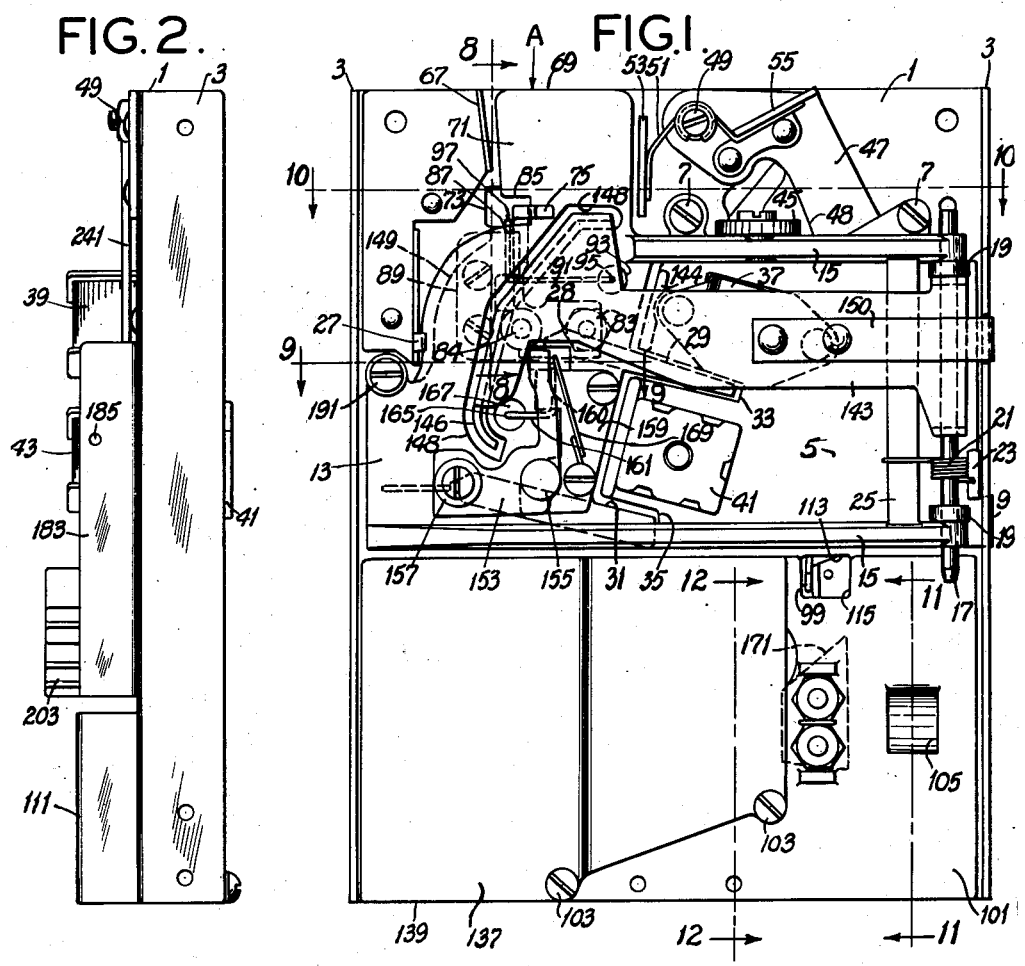

Aug. 11, 1942.  B. W. FRY  2,292,628
COIN SELECTOR
Filed Dec. 4, 1940  5 Sheets-Sheet 2

Benjamin W. Fry,
Inventor
Haynes and Koenig
Attorneys

Aug. 11, 1942. B. W. FRY 2,292,628
COIN SELECTOR
Filed Dec. 4, 1940 5 Sheets-Sheet 3
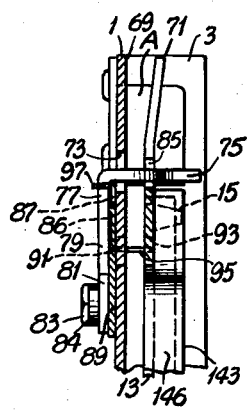
FIG. 8.
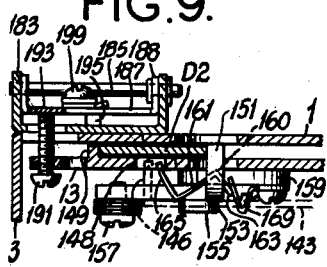
FIG. 9.
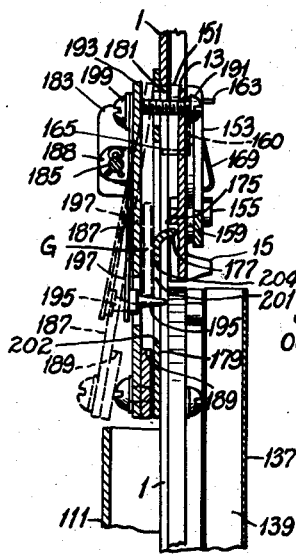
FIG. 13.
FIG. 7.
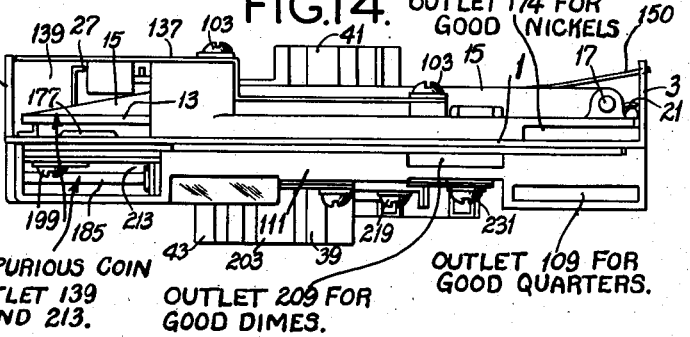
FIG. 14.
Benjamin W. Fry,
Inventor
Haynes and Koenig
Attorneys Aug. 11, 1942.　　　　B. W. FRY　　　　2,292,628
COIN SELECTOR
Filed Dec. 4, 1940　　　5 Sheets-Sheet 4
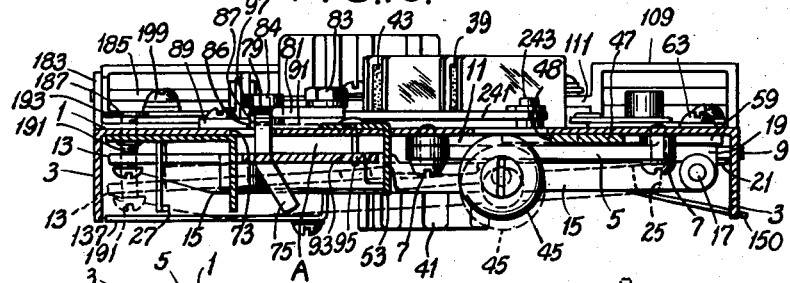
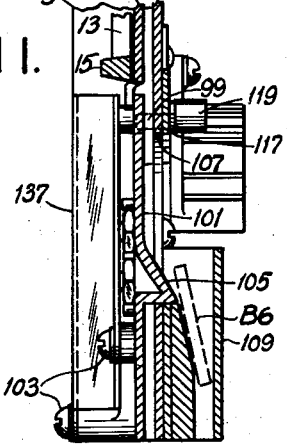
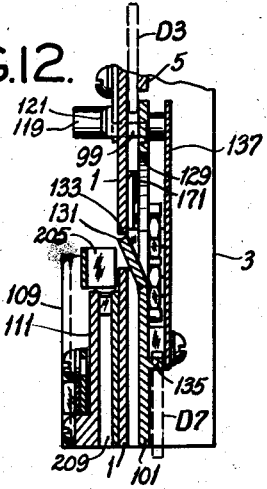
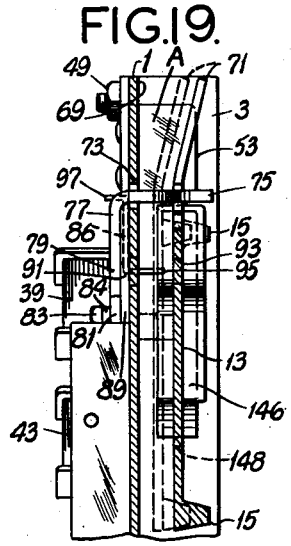
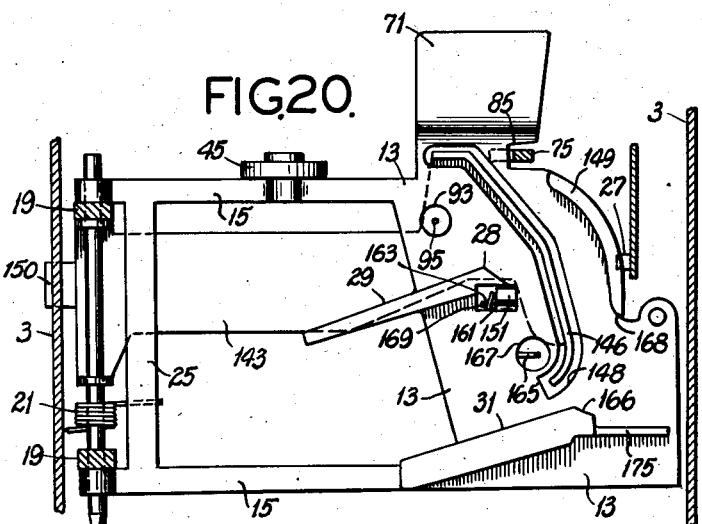
Benjamin W. Fry,
Inventor
Haynes and Koenig
Attorneys

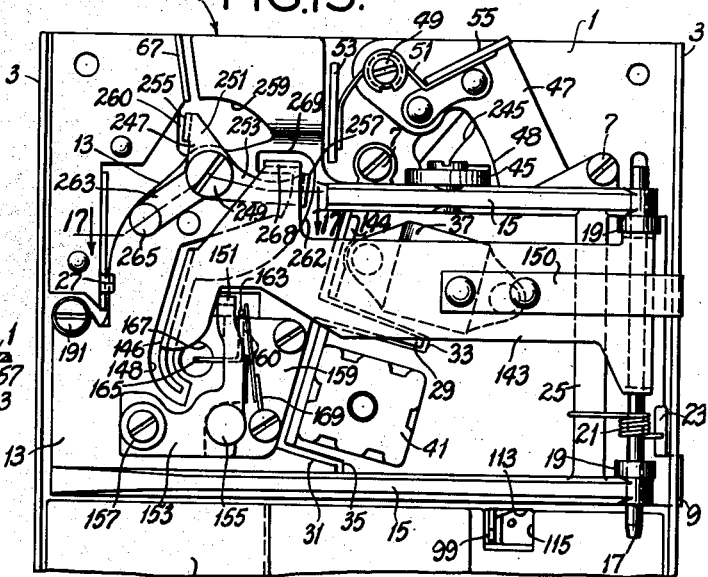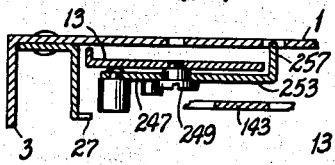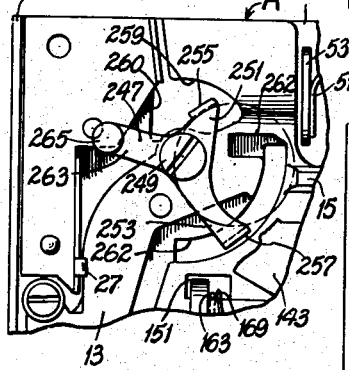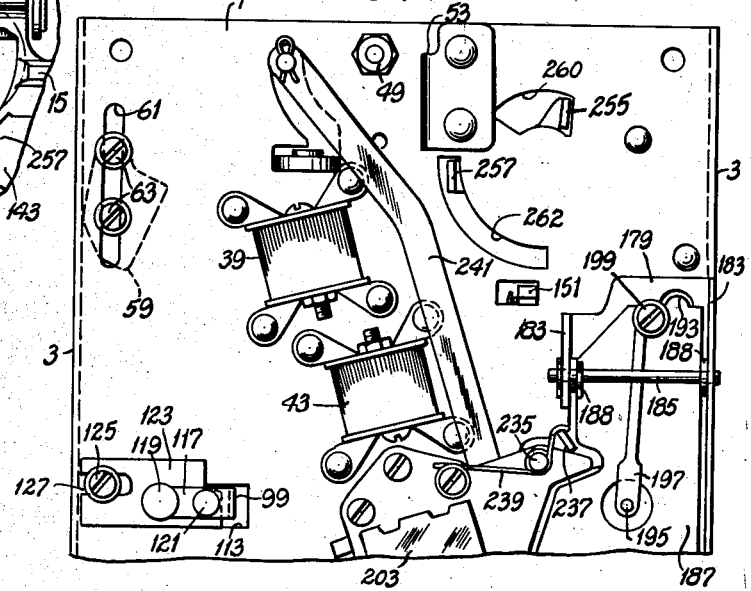

Patented Aug. 11, 1942

2,292,628

UNITED STATES PATENT OFFICE 2,292,628

COIN SELECTOR

Benjamin W. Fry, University City, Mo., assignor to National Slug Rejectors, Inc., St. Louis, Mo., a corporation of Missouri Application December 4, 1940, Serial No. 368,487

24 Claims. (Cl. 194—99)

This invention relates to coin selectors and with regard to certain more specific features, to multiple coin selectors for segregating several denominations of legitimate coins from their counterfeits and from one another.

Among the several objects of the invention may be noted the provision of a multiple coin selector which is adapted to segregate various coins (which term is used herein as inclusive of both good and counterfeit coins, slugs, discs, washers, tokens and the like) in accordance with their weights, diameters, materials, and surface characteristics; the provision of apparatus of the class described which, in addition to differentiating between good coins and others, will differentiate between several denominations of good coins, for directly returning good coins of incorrect denomination to the operator, if desired, without the necessity for a manual clearing operation, or which will differentiate good coins for other purposes; the provision of apparatus of the class described which is adapted to receive and to sort coins according to their usual denominational characteristics prior to testing them otherwise, whereby each denomination of coin is subject to tests for spuriousness which are particularly adaptable to that denomination, and no other, thus simplifying both the structural and operational characteristics of the device; the provision of a coin selector of the class described which includes elements readily adapted for conjoint use with other types of coin-testing apparatus; and the provision of a coin selector of the class described which is simple in arrangement of parts, reliable and positive in operation and particularly compact in form. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of one form of the invention;

Fig. 2 is an end elevation viewed from the left of Fig. 1;

Fig. 3 is a plan view viewed from the top of Fig. 1;

Fig. 7 is a view similar to Fig. 1 but showing parts broken away, and indicating paths of good coins of 5¢, 10¢ and 25¢ denominations;

Fig. 8 is a vertical section taken near line 8—8 of Fig. 1;

Fig. 9 is a horizontal section taken near line 9—9 of Fig. 1, showing a 5¢ coin in operative position and with a pressure gate indicated only in dotted lines;

Fig. 10 is a horizontal section taken near line 10—10 of Fig. 1 and showing in dotted lines alternative positions of certain parts;

Fig. 11 is a vertical section taken near line 11—11 of Fig. 1 showing a good 25¢ piece passing out;

Fig. 12 is a vertical section taken near line 12—12 of Fig. 1 showing a 5¢ counterfeit passing out;

Fig. 13 is a vertical section taken near line 13—13 of Fig. 5 showing a 10¢ coin in position;

Fig. 14 is a bottom plan view of Fig. 1;

Fig. 15 is a fragmentary view similar to the upper portion of Fig. 1, but showing an alternative embodiment;

Fig. 16 is a fragmentary rear elevation corresponding to Fig. 5, but showing said alternative embodiment of Fig. 15;

Fig. 17 is a cross section taken near line 17—17 of Fig. 15, parts being broken away;

Fig. 18 is a fragmentary view corresponding to the upper left portion of Fig. 15 but illustrating operation by an inserted coin;

Fig. 19 is a vertical section like Fig. 8, but with a gate part in a moved position; and, Fig. 20 is a vertical section taken on line 20—20 of Fig. 3.

Similar reference characters indicate corresponding parts throughout the several views of the drawings.

Figure 4:
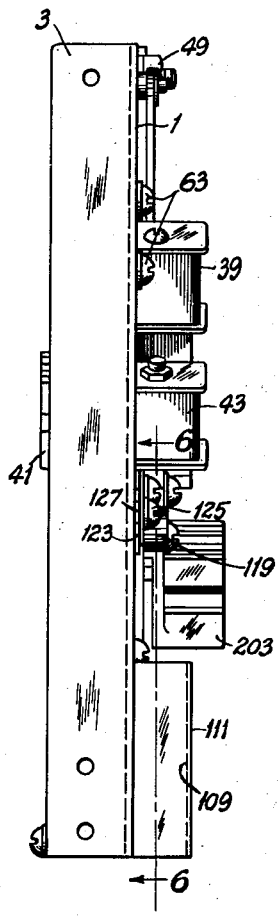
Fig. 4 is an end elevation viewed from the right of Fig. 1 and from the left of Fig. 5.

The present invention refers particularly (by way of example) to means for separating from one another and testing for spuriousness United States 25¢, 10¢ and 5¢ coins. The testing for spuriousness is in part physical and in part compositional. Since a large proportion of counterfeit coins presented to the ordinary coin selector are abnormal in their physical characteristics, a number of tests for such physical characteristics are made ahead of the compositional tests for each of the coins. Since, however, the problem of separating from one another good coins of various denominations, such as the separation of 25¢, 10¢ and 5¢ pieces (quarters, dimes and nickels respectively) involves a test for size only, such testing is made ahead of the time that any of the tests for spuriousness are carried out. An additional reason for doing this is that any imitation of any given denomination of coin usually at least imitates its proper diameter, so that by first sorting according to size (diameter), all good and spurious 25¢ pieces (quarters) for example may thereafter be sent through a separate succession of testing means; all good and spurious 5¢ pieces (nickels) for example, may be sent through a second succession of testing means; and all good and spurious 10¢ pieces (dimes) may be sent through a third succession of testing means. In other words, all good and spurious coins are first sorted according to sizes which are usually according to intended denominations, and then the respective assortments are respectively tested.

The above arrangement also has the advantage of providing a device which is quite compact. For example, this apparatus which tests three different denominations of coins, instead of being three times as large is only slightly larger than prior apparatus designed to apply similar tests to coins of one of the denominations.

Referring now more particularly to Figs. 1–5, there is shown at numeral 1 a main center plate which forms the main vertical support for the other parts of the apparatus to be described. This center plate is flanged as shown at 3 to provide suitable fastening means for attachment into vending apparatus or the like which the apparatus serves.

Fastened to the center plate 1 (on its front surface as viewed in Fig. 1) is a guide plate 5 fastened by upper screws 7 (see also Fig. 10) and by a lower holding lug 9 (Fig. 1). The lug is in a slot in the right-hand flange 3. This guide plate 5 is spaced from the center plate 1 as indicated at 11 at a distance to accommodate between it and the plate 1 both 25¢ pieces (quarters) and 5¢ pieces (nickels).

To provide removable runways for the quarters and nickels, a swinging gate 13 is provided, this gate including arms 15 by means of which it swings on a pintle 17. The pintle 17 is supported in lugs 19 which extend upward from the fixed guide plate 5. The swinging gate 13 is normally biased toward the center plate 1 by a coil spring 21 reacting between a fixed lug 23 and a cross bar 25 between the arms 15. A limit lug 27 prevents the gate 13 from being swung out from plate 1 more than a predetermined distance.

A purpose of the swinging gate 13 is to provide independently of guide plate 5 a movable supporting track 29 for quarters, and also a supporting track 31 for nickels. These tracks are fastened to the gate and swing with it (Figs. 1, 7 and 20). The track 29, when the gate is swung shut, passes through a notch 33 in the guide plate 5 and takes up a position between the guide plate 5 and the center plate 1. The supporting track 31 for nickels moves through a notch 35 when the gate 13 is closed. Thus both the tracks 29 and 31 serve to form removable runways for quarters and nickels respectively between the guide plate 5 and center plate 1. Since the tracks 29 and 31 swing with the gate 13 away from the center plate 1, they may drop any coins which are held up on the tracks.

To prevent coins which are detained in the runways 29 and 31 from moving over with the runways when the gate 13 is opened, and thus sticking, there is provided an overlying pusher plate 143 which is also rotary on the pintle 17 and normally held toward a fixed stop 144 on the fixed guide plate 5. This pusher plate 143 at its left end carries a turned-in lip 146 which extends through a slot 148 in the gate 13 (Figs. 1, 19 and 20). The inner edges of the lip 146 permit passage of coins between said edges and plate 1 and down the runways 29 and 31; but if a coin becomes stuck and the gate 13 is opened, the lip 146 holds the coin so that it cannot follow the runways on the gate for support. In other words, the coins are pushed off the runways to drop down. The leaf spring 150 normally biases the pusher plate 143 in the same direction as the bias of coil spring 21 on gate 13. After a certain angle of opening of the swinging gate 13 has been reached, the pusher plate 143 is engaged and is moved outwardly as a unit with the gate 13, against bias of spring 150.

Figure 5:
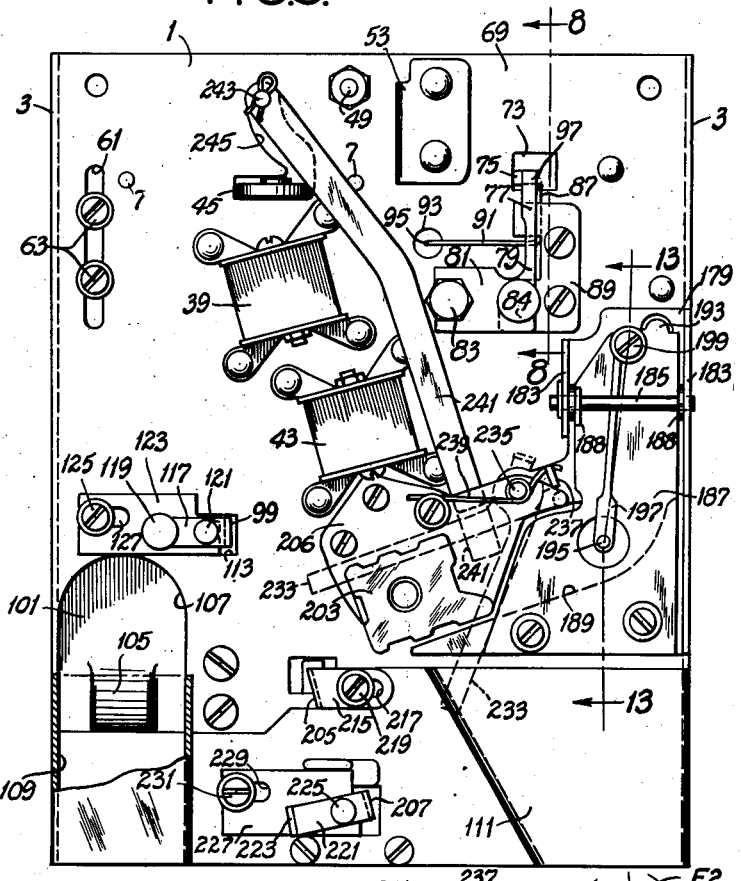
Fig. 5 is a rear elevation of Fig. 1.

For magnetically testing the quarters which pass down the upper track or runway 29, the guide plate 5 carries a magnet keeper 37 in spaced relation to the poles of a magnet 39 carried on the opposite center plate 1 (Fig. 5). The guide plate 5 and center plate 1 also carry magnetic members 41 and 43 respectively, shown in Figs. 1 and 5 respectively, spaced from one another to permit passage therebetween of nickels that roll down the track 31. The purpose of these magnetic testing means will be specified hereinafter.

In order to swing open the gate 13 the limited distance shown in Fig. 10, it is provided on the upper one of its arms 15 with a horizontal follower roller 45 which is engaged by the upper portion 48 of a scavenger arm 47. The upper portion 48 of the arm 47 therefore acts as a driving cam for the follower roller 45. The arm 47 is pivoted at 49 to the center plate 1 and is normally biased to the counterclockwise position shown in Fig. 1 wherein the gate is closed. The bias is effected by a coil spring 51 reacting from a fixed lug 53 on the center plate 1 against a flat finger plate 55 upon the top of arm 47. The finger plate 55 serves for manual (finger) application of force downward to rotate the arm 47 clockwise (Fig. 1) so that its upper portion functions as a cam for the follower roller 45 to swing open the gate 13 and pusher plate 143.

The scavenger arm 47, besides functioning as a cam, has a downward extension 57 shown better in Fig. 7. In Fig. 7 the gate 13 and plate 143 have been removed, but the closed positions of the tracks 29 and 31 (and also an additional guide 149) are shown by dotted-cross-hatching.

The downward extension 57 of the arm 47 functions as a scavenging bar when the arm 47 is depressed, sweeping respectively between magnetic devices 37, 39 and 41, 43. Its ultimate clockwise position is shown in dotted lines in Fig. 7, which is assumed when runways 29 and 31 are withdrawn due to the action of 48 on roller 45. The ultimate counterclockwise position of 47 is shown in solid lines. The latter position is determined by an adjustable stop wedge 59 which is movable up and down in a slot 61, and which is held in predetermined position by lock screws 63 (Fig. 5).

The solid-line position (Fig. 7) of the lever 47 is important, because the lever includes a third functional part consisting of an anvil or deflector 65 operated to bounce or deflect certain coins in a manner to be described.

From the above it will be clear that the arm 47 has three functions: (1) to cam open the gate 13; (2) subsequently to scavenge the space near the magnets which was occupied by the tracks 29 and 31 when the gate was closed; and (3) to hold the coin deflector 65 in proper position when the lever is returned against the stop 59.

An inlet opening is determined by the lug 53, a second and opposite lug 67 (both on the center plate 1), the intermediate portion 69 of the center plate 1 and an upward extension 71 of the gate 13. In order physically to test coins entering at the opening A thus determined, an opening 73 is provided in the center plate 1, and a notch in 71, through which extends a detector finger 75. This finger 75 is mounted upon an upwardly extending arm 77 of a bell crank 79 (see also Fig. 5). A laterally extending arm 81 of the bell crank 79 carries a counter weight 83, so that normally the finger 75 is biased toward the right in Fig. 1 and the left in Fig. 5. The bell crank 79 is pivoted at 84 and engagement of the finger 75 with the adjacent notch 85 in the extension 71 determines the position of the finger 75. The position of the finger 75 is such when the gate 13 is closed that a normal quarter will push it aside (clockwise in Fig. 5 and counterclockwise in Fig. 1), the weight of the quarter being enough to cause lifting of the weight 83.

However, if a spurious quarter of light weight is inserted, the weight 83 will prevent the finger 75 from being pushed aside. Thus there is brought about the first test, this being for light weight quarters. But nickels and dimes, being smaller, and, in addition, smaller spurious coins, pass through the space between the finger 75 and the opposite lug 53, without moving the finger 75, at least not sufficiently for the purpose to be mentioned. They are directed, or by-passed to the left by the slope 28 on runway 29.

The finger 75 is bent over as shown in Fig. 3 for engagement by the lower end of the notch 85, which when the gate 13 is swung open, moves aside. This clears any light weight coins which are held up on the finger 75.

A combined washer trap and deflector is also associated with the finger 75 and consists of a wire having a vertical portion 87 (Fig. 5) which is rotary in a groove 86 behind a supporting bracket 89, the supporting bracket 89 being also that which supports the pivot 84 for the bell crank 79. This wire portion 87 has a lower lateral portion 91 extending to openings 93 into which the wire is bent to form a finger 95. This finger 95, like the finger 75, intersects the inlet A but it is located beyond said finger 75 and at the entry to runway 29.

At the upper end of the portion 87 of the wire is also a bent-over portion 97 which when the finger 75 is moved clockwise (Fig. 5) causes the wire to rotate on its vertical axial portion 87, thus to withdraw the finger 95 from the entry A. On the other hand, when the finger 75 is in its position shown in Fig. 5, the finger 95 intersects below said inlet and ahead of the runway 29 (see also Fig. 3).

When a true quarter is inserted in the opening A, its diameter and weight result in deflection of the finger 75 to the left in Fig. 1, which through the portion 97 results in rotating the wire on the axis 87 and withdrawal of the finger 95, whereupon the quarter may drop freely down on to the track 29 to roll to the right (Fig. 1) in between the magnetic members 37 and 39, as indicated by dotted lines B1 and B2 in Fig. 7. The path followed is indicated at C in Fig. 7. If a counterfeit quarter is too large, it sticks between 29 and 53, and may then be cleared by swinging out the gate 13 with track 29; or it may be refused at an insert opening (not shown).

As true or good quarters leave the end of the track 29, they drop as indicated at B3. Each here strikes the upper edge of a movable bar 99 and falls off to the right to the position B4 behind a lower guide plate 101 which is fastened to the center plate 1 at fasteners 103 (Fig. 7). Plate 101 includes a deflecting tongue 105 (Fig. 11) which extends back through an opening 107 (see also Fig. 5) in the plate 101. Next to the opening 107 (on the back) is an outlet chute 109 (see Fig. 5) forming part of a plate 111 attached to the rear of the device. The outlet chute 109 is for good quarters, see also Fig. 14. The final position for a good quarter is shown at B5 in Fig. 7 (see also the dotted position B6 in Fig. 11).

The bar 99, as indicated, intersects an opening 113 in the center plate 1 and a notch 115 in the front guide plate 101. The guide plate 101 and the center plate 1 are spaced at points not required for fastening, so as to accommodate coins therebetween. The bar 99 crosses this space at the openings 113 and 115. The bar 99 is also fastened to an arm 117 (Fig. 5) which carries a counterweight 119 and is pivotally mounted at 121 on a guide bracket 123, the latter being adjustably held by a fastening screw 125 cooperating with a slot 127. The lateral position of the bar 99 may thus be adjusted so that quarters which strike it and deflect it down will fall off to the right (Fig. 7; B3) and thus enter the good coin passage 109 as described. Spurious quarter coins of improper composition which have too high an electrical conductivity, such as for example copper, will in passing the magnet 39 have induced therein eddy currents which set up a reacting magnetic field which slows down the coin to such an extent that it drops practically straight down off the ledge of the track or runway 29. Thus when it strikes the bar 99 and the bar is rotated downwardly, the coin is deflected to the left. Hence the coin falls in at a different point between the plate 101 and the center plate 1.

At this point, the plate 101 is provided with an opening 129 across which reaches a lug 131. The lug 131 passes into an opening 133 in the center plate 1 so that these quarters of too high a conductivity (falling to the left of 99) are deflected forward through the opening 129 (Figs. 7 and 12) and into position on a track 135 which forms a part of the plate 101. This track 135 is covered as indicated in Fig. 1 by a plate 137 and communicates with a bad coin outlet 139. This outlet is for spurious 25¢ coins, and for certain other ones which will be referred to later.

Spurious quarters of lower electrical conductivity than true quarters, such as of brass, lead, zinc, or German silver, will pass the magnet 39 too fast and strike the properly positioned anvil or deflector 65 to be bounced or deflected therefrom to the left of the bar 99 and down onto the deflector 131 and through the opening 129, thence down the track 135 and to the spurious coin outlet 139.

Any quarter coin that is too magnetic (for example iron) will stick on the magnet 39, and upon depressing the plate 55 and rotating the scavenger bar 57 will be scavenged to the left, the tracks 29 and 31 being at this time moved laterally out of intersecting position, because of the action of the bar 47 on the roller 45. The coin being scavenged out of the magnetic field then falls down on the outside curved portion 141 of the plate 101 and downward into the spurious coin outlet 139.

As above forcast, spurious quarter coins which are too light and are held up by the finger 75 are also released by the camming action on the finger 75 when the gate opens. These coins drop down around the curved portion 141 and into the spurious coin outlet 139. Spurious heavy quarters that are too large and which stick between the track 29 and the lower edge of the lug 53 are similarly cleared by dropping gravitationally when the track 29 is rotated from under the coin.

Any quarter-sized washers are intercepted by the return action of the wire finger 95 after the rear of such a coin leaves the finger 75. This is because the finger 75 is normally returned to its original position behind the coin by the weight 83, and this in turn forces the wire finger 95 to intersecting position in any washer hole. Naturally, if there is no hole in the coin, as in a good quarter, the finger cannot intersect. However, if the surface of the coin is too rough, or if it has a hole in the center, the biased finger 95 will intersect the hole or grip the too-rough surface and prevent further progress of the coin. Then upon depressing the plate 55 and opening the gate, the curved end portion of the finger 75 is contacted so that through the elements 77, 97, and 91 (Fig. 5) the finger 95 is withdrawn to release the washer to drop down into the spurious coin outlet 139.

The spurious coins which are held up on the track or runway 29 (as well as the runway 31 to be described) are scraped off as the tracks 29, 31 are pulled aside with the swinging open of the gate 13. This is due to the lip 146 of pressure plate 143 which is bent toward the gate 13 and which lip passes through an opening 148 in said gate 13 (Figs. 1 and 20). Since the gate 13 has some lost motion the lip 146 remains stationary while the gate 13 moves with the result that any tendency for any coin to remain on either of the tracks 29 or 31 is prevented. Such coins are pushed off by the lip 146 and drop down as described above.

From the above it will be seen that coins, both good and spurious, which are smaller than quarters, will drop between the lug 53 and the finger 75 without moving the latter. Hence the wire finger 95 is not withdrawn, and such coins are deflected or by-passed or branched off to the left of the track 29, being guided by surface 28, as indicated at D1 for example (Fig. 7). An auxiliary guide 149 on the swinging gate 13 determines the path of the largest of said coins, which herein are intended to be of the size of United States nickels. Substantially larger coins that are smaller than quarters are blocked.

By-passed coins are tested by a size and weight responsive finger 151 which is carried on a bell crank 153 pivoted at 155 on the gate 13, and carrying on one of its arms a counterweight 157. The bell crank 153 is normally biased counterclockwise (Fig. 1) by the weight 157. The pivot 155 is carried on a bracket 159 fastened to the gate 13. This bracket 159 supports in a notch 160 a wire 161 for rotation about a vertical axis. Wire 161, as shown in Fig. 9, includes a bent portion 163 which, when the finger 151 is moved to the right (Figs. 1 and 9), causes another finger portion 165 of the wire to be withdrawn from intersecting the passage above the lower track 31. The finger 165 traverses openings 167 when in intersecting position. In Fig. 9 a 5¢ coin (nickel D2) is shown in position, and as having moved the finger 151 to the right, thus having rotated the wire 161 so as to have withdrawn the finger 165, thus permitting passage of the coin down onto the track 31. After the coin passes the finger 151, the finger is returned by reason of the weight 157, and the wire 161 is returned to its original position by action of a wire spring 169. If the surface of the coin is too much rougher than that of a nickel or has a hole in it, it will be trapped by the return action of the finger 165 through the hole, as in the case of pin 95.

If the coin is too light it will not deflect the finger 151 and therefore will be impeded. By depressing the plate 55 so as to open the gate 13, the rib 146 pushes any impeded coin from the track 31, whereupon it drops into the spurious coin outlet 139.

Assuming that a nickel coin rolls to the right down the track 31 (Fig. 7), it next is tested by the magnetic means 41, 43. If too magnetic (iron for example) it sticks at the magnet to be removed by the scavenger 47. If it is a proper nickel it rolls down the path E through the positions D1, D2, D3 and to position D4 between the plate 101 and the center plate 1. Here it strikes the sharpened edge of an anvil 171 (Fig. 12) and bounces to the left over the lug 131 in between plates 101 and 1. It goes through positions D4, D5, D6 and to position D7, and travels over a curved track 173 behind plate 101.

Any spurious 5¢ coins which have too high an electrical conductivity, such as of copper, will be decelerated by the magnetic means 41, 43, so that they drop straight down and clear the left end of the anvil 171 (Fig. 7) and strike the deflecting lug 131 to be deflected forwardly through the opening 129 and down onto the track 135, from whence they gravitate to the spurious coin outlet 139, along with spurious quarters.

Any spurious nickels that have too low a conductivity are not enough decelerated by the magnets 41, 43, and strike the bar 99 which tilts down and causes these pieces to fall to the left, but not enough to clear the lug 131. They fall down on the lug and are also deflected forwardly through the opening 129 and down onto the track 135 and thence to the spurious coin outlet 139.

From the above it will be seen that all 5¢ coins (smaller than quarters) and still smaller coins are by-passed from the testing passages for the 25¢ coins. Likewise, all 10¢ coins, both good and spurious, are by-passed from the testing passages for the 5¢ coins, as indicated by the dotted-line positions F1, F2, F3, F4, F5, F6 and F7 in Figs. 1 and 6. Such coins are not large enough to enforce deflection of the second testing finger 151, and hence the second wire finger 165 is never withdrawn from the inlet of the testing passages for the nickels. This means that coins smaller than 5¢ pieces are deflected to the left by the wire 165 (Fig. 7) and over the end of the runway 31. Slope 166 ensures this.

It remains to sort out the spurious 10¢ coins from the good 10¢ coins. At such pieces pass through the opening determined by the left edge 166 of the track 31 and the lower edge 168 of the track 149 they are tested for excessive size. If they pass, they strike a lug 175 on the back of the gate 13, which acts as a shingle over a lug 177 turned in from a plate 179 fastened to the back of center plate 1 (Fig. 13). The lugs 175 and 177 serve to transfer the coins through an opening 181 in the center plate, so that the dimes are tested behind the center plate 1, referring to Figs. 1 and 7, or to the left, referring to Fig. 13.

The plate 179 has outstanding ears 183 which carry a horizontal pintle 185 for pivoting a plate 187 on ears 188. This plate 187 carries a lower track or runway 189. The normal gravitational position of plate 187 is such as shown in dotted lines in Fig. 13, but it is held in its solid position shown in Fig. 13 by a screw 191 which extends from the gate 13 through the opening 181 in the center plate 1. This screw operates upon an upper (with respect to pintle 185) extension 193 of the plate 187 and therefore rotates the plate counterclockwise to its solid-line position such as shown in Fig. 13, wherein the track 189 is adapted to receive a dime which has been deflected through the opening 181 by the deflectors 175 and 177, provided the coin passes a springing testing pin 195. This pin 195 is mounted upon a flat leaf spring 197 which at its opposite end is fastened to the plate, as indicated at 199. If the dime is of proper weight, the spring 197 is deflected (but not plate 187), and the coin passes on down to the track 189. If the coin is too light, the pin 195 will not be deflected sufficiently and therefore the coin, which is shown in dotted lines at G in Fig. 13, will stick.

If the coin G is supported upon the pin 195 by reason of being too light, it will ultimately be discharged downwardly when the gate 13 is moved outwardly to its dotted-line position upon clearing, as indicated in Fig. 10. This is because the screw 191 is withdrawn from extension 193 during this operation, so that the plate 187 as it swings to its normal dotted-line position pulls out the pin 195. The pin is tapered and permits the coin G to drop downwardly as above indicated. The pin also acts as a washer trap for coins with holes in them, these being released upon clearing when the dotted-line position of parts is assumed in Fig. 13. After the leading edge of a coin passes the pin 195, the pin 195 presses against the side surface of the coin, forcing it against the top and bottom edges 202 and 204 of the opening 201. The top edge 204 is spaced from the rail 189 a distance slightly less than the diameter of a dime. If the coin is smaller than a dime, it will be tilted through the opening 201 by the spring action 197 on the pin 195, thus discharging it from the normal dime pathway.

Figure 6:
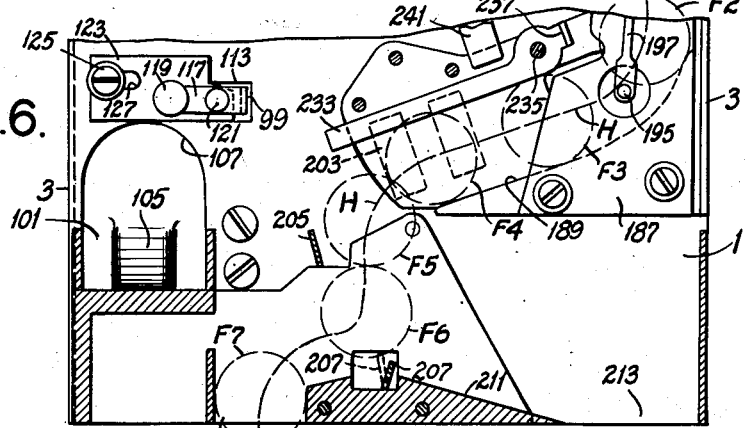
Fig. 6 is a fragmentary view similar to the lower end of Fig. 5, but showing parts broken away and indicating a path of a good 10¢ coin.

If by reason of sufficient weight the 10¢ coin G deflects and passes the pin 195, it will pass down the track 189 as indicated at F2, F3, F4, in Fig. 6. This track directs the down coins past the lowermost magnet member, heretofore not mentioned. This magnet is shown at 203 and is mounted upon a bracket 206, which at regions under the magnet is spaced from the center plate 1, so that 10¢ coins may pass under the magnet for magnetic testing. If a 10¢ coin is good, it takes the path H through positions F5, F6, F7 shown in Fig. 6 which is one wherein the piece is slowed up enough so that it drops substantially straight down, clearing a bar 205 and striking a movable bar 207 in its dotted-line position (the bar being then thrown into its solid-line position) to be deflected to the left and out of the outlet 209 for good dimes.

On the other hand, should the 10¢ coin be spurious and of too low electrical resistance, such as of copper, the magnet slows it up to a degree where it falls short of the path H taken by the good dimes but in striking the bar 207 moves off to the right down an incline 211 and into a spurious 10¢ coin outlet 213, which is adjacent to the outlet 139 for the spurious quarters and nickels.

Spurious 10¢ coins of higher electrical resistance, such as of brass, zinc, lead and German silver, etc., pass the magnet 203 too fast and strike the bar 205 and bounce back to the right of the movable bar 207 and pass out of the opening 213.

The bar 205 consists of a fixed lip which is bent over from bracket 215 carrying a slot 217 for adjustable fastening by means of a screw 219 (see Fig. 5).

The movable bar 207 is in the form of a lip of a lever 221 which is counterweighted as indicated at 223 and pivoted at 225 to an adjustable bracket 227. Adjustment is obtained by means of the slot 229 in cooperation with a holding screw 231 (Fig. 5). Cover plate 111 forms a support for these items, as well as for the chute 109 already described.

Spurious 10¢ coins of high magnetic characteristics are of course stopped by the magnet 203 and in order to scavenge them and any others that may stick above the track 189, there is provided an auxiliary scavenging arm 233 pivoted at 235 and having a lug 237. This arm is normally biased by a spring 239 to assume the upper dotted-line position shown in Fig. 5 or the solid-line position indicated in Fig. 6. In order to scavenge, this arm is pressed down by means of a push rod 241 which extends up to a pin connection 243 through an opening 245. The pin connection is carried on the lever 41, so that when the finger plate 55 is depressed, not only is the scavenging arm 47 operated, but also the scavenging arm 233 through the push rod 241. Thus at one push of 55, the whole machine is cleared of spurious coins.

In Figs. 15–18 is shown another form of the invention which is similar to the above in most particulars, as indicated by similarity of reference characters, but the initial testing apparatus at the inlet A is different. It is to be understood that this alternative apparatus may also be substituted for 151 and 165 but for brevity is not there shown. This alternative testing apparatus replaces the fingers 75 and 95. It consists of a cradle 247 pivoted at 249 to the gate 13. This cradle has arms 251 and 253 which respectively carry lugs 255 and 257. The lug 255 extends through an additional opening 259 in the gate, and the lug 257 extends through an extension 262 of the opening 148. An opening 260 is made in the center plate 1 opposite the opening 259 also to accommodate the lug 255 (Fig. 16). An opening 264 is also made in said center plate 1 opposite the opening 262 to accommodate the lug 257. Thus it will be seen that the lugs 255 and 257 intersect the inlet opening A on opposite sides. The cradle member 247 has a third arm 263 which carries a counterweight 265.

When a 25¢ coin of proper size is inserted into the opening A, it drops down and is caught by the lugs 255 and 257 and cradled therebetween, as indicated in Fig. 18. This tilts the cradle if the coin is of proper weight. If the coin is too light, the cradle will not tilt, and the passage of the coin is blocked. A proper 25¢ coin tilting the cradle is thrown out onto the track 29 which it is deemed not necessary further to illustrate since it is the same as the one shown in the first form of the invention described.

Any coin caught in the cradle 247 and which does not tilt it is cleared by movement of the gate upon depression of the plate 55. In this case an additional finger 268 is extended from the springing pressure gate 143 through another extension 269 of the opening 262. Outward movement of the gate 13 also causes outward movement of the cradle 247 so that the support for the coin at lugs 255 and 257 is pulled away while the coin is held by finger 268. There is of course clearance between pusher lugs 146 and 268 and center plate 1, permitting normal coin passage.

Coins that are too small (such as 5¢ coins and 10¢ coins and undersize imitations) will not span the lugs 255 and 257 and will pass between them. In doing so they function like the coins which are too small and pass through the fingers 75 and 95 of the preferred form.

The various testing passages for the various coins are of such thickness as to block coins that are too thick for the denomination under test.

Hereinafter, the term coin-receiving passage or by-passage refers to inlet A down to lip 166 (Fig. 7). The quarter-testing passage starts at wire 95. The nickel-testing passage starts at wire 165. The dime-testing passage starts at track edge 166 and lug 175. In effect the three testing passages are branched from the coin-receiving passage.

It is to be understood that any or all of the good-coin outlets 109, 174 and 209 may respectively be connected with vending apparatus for goods having the respective purchase values of a quarter, nickel or dime, or any combination. Also, if a given one of these outlets is not connected to vending apparatus, it may be connected to a coin-return chute which makes available to a customer an inadvertently inserted good coin of improper denomination, and this without the necessity of operating a manual clearing mechanism. The return is prompt and direct. Bad coins from outlets 139 and 213 may be withheld or returned, as desired.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a coin selector, means establishing a first coin-receiving passage for all coins both good and bad of a range of sizes and weights, and a testing passage leading from said first passage for coins of predetermined diameter, clearing means, means at the junction between said passages adapted to block spuriously light coins of the predetermined diameter and coins greater than said diameter and to deliver to said testing passage other coins of said diameter, said means at the junction by-passing from said testing passage coins which are smaller than said diameter, said clearing means operatively related with said first coin-receiving passage and said testing passage for dislodging coins arrested therein when said clearing means is operated.

2. In a coin selector, means establishing a first coin-receiving passage for all coins both good and bad of a range of sizes and weights, and a testing passage leading from said first passage for coins of predetermined diameter, clearing means, means at the junction between said passages adapted to block spuriously light coins of the predetermined diameter and coins greater than said diameter and to deliver to said testing passage other coins of said diameter, said means at the junction by-passing from said testing passage coins which are smaller than said diameter, and means forming a second testing passage leading from the coin-receiving passage and adapted to test said by-passed coins, said clearing means operatively related with said first coin-receiving passage, said testing passage and said second testing passage for dislodging coins arrested therein when said clearing means is operated.

3. In a coin selector, means forming a coin-receiving passage for coins of various diameters and weights, and a first testing passage leading from said coin-receiving passage for testing coins of a predetermined size, a second testing passage for other coins of smaller size, means between the inlet passage and the first testing passage for directing to said first testing passage only coins of certain size, said testing means by-passing coins of smaller diameters of all weights to said second testing passage and blocking coins larger than will go into the first testing passage and also those which would go into said first testing passage but which are too light.

4. In a coin selector, means establishing a first coin passage for receiving all coins both good and bad of a range of sizes, successive testing passages for various coin sizes branched from said first passage, means in the first passage adjacent each branch passage adapted to block light coins of correct size from the adjacent testing passage but to direct thereto coins of a predetermined size and above a certain weight, each of which blocking means is adapted to by-pass from its respective branch passage all coins which are subnormal in size for the respective adjacent branch passage.

5. In a coin selector, means establishing a coin by-passage, and a plurality of testing passages branching from said by-passage, means along the by-passage preventing the entry into the respective testing passages of coins oversize with respect to said passages, directing means at the entry of each testing passage responsive only to coins of proper diameter and weight to effect entry of such coins to the respective testing passage, said directing means by-passing through the by-passage coins that are undersize with respect to the respective testing passage.

6. A coin selector comprising a wall, a swinging gate movable to and from said wall and providing in one position therewith a coin passage, a coin runway on said gate which supports coins when the gate is near the wall, manually operable means articulated with the gate whereby the latter may be opened to withdraw said runway, and means extending through the movable gate adapted to prevent coins from maintaining a support on the gate when the gate is opened.

7. In a coin selector, means establishing a coin passage, a finger intersecting the passage and movably mounted for deflection by a coin of sufficient size, a movable pin intersecting the passage, an operating connection between the finger and the pin arranged so that the finger in response to actuation by a coin of sufficient size causes withdrawal of the pin, said pin otherwise being biased to intersecting position, the finger and the pin being so spaced that a coin of insufficient size will pass therebetween so as not to actuate the finger and hence not the pin, testing means for coins of sufficient size that pass the pin, and means providing a by-pass for coins of insufficient size and which are otherwise blocked by the pin.

8. In a coin selector, means establishing a coin-receiving passage, spaced means intersecting the passage responsive to a coin of proper size and sufficient weight to move to a releasing position, means forming a testing passage to receive released coins of proper diameter and sufficient weight, said means intersecting the receiving passage including a member blocking the testing passage except when responding to release a coin of proper diameter and sufficient weight but maintaining said intersection against passage of coins of subnormal diameters, and means forming an outlet from the intersecting means which by-passes said testing passage.

9. In a coin selector, means establishing a coin-receiving passage, spaced deflecting means intersecting the passage responsive to a coin of proper size and sufficient weight to move to a releasing position, a means forming a testing passage to receive released coins of proper diameter and sufficient weight, said deflecting means including a member blocking the testing passage except when responding to a coin of proper diameter and sufficient weight but maintaining said passage against passage of coins of subnormal diameter, a second passage means positioned to by-pass said testing passage, said deflecting means being adapted to prevent underweight coins of sufficient diameter from passing into said testing passage.

10. In a coin selector, means establishing a coin-receiving passage for quarter, nickel and dime coins and also individual communicating testing passages respectively for said quarters, nickels and dimes, spaced pairs of deflecting means one being between the quarter-testing passage and coin-receiving passage and the other between the nickel-receiving passage and the coin-receiving passage, the deflecting means at the quarter-testing passage being responsive to a coin of quarter size and sufficient weight to move to a releasing position wherein quarters and coins of equal diameter are deflected into the quarter-testing passage, said deflecting means at the nickel-testing passage being responsive to a coin of nickel size and sufficient weight to move to a releasing position wherein nickels and coins of equal diameter are deflected into the nickel-testing passage, said deflecting means at the quarter-testing passage including a member blocking the quarter-testing passage except when responding to coins of proper diameter and sufficient weight, whereby nickels, dimes and other coins of insufficient diameters are directed into the deflecting means at the nickel-testing passage, said last-named deflecting means including a member blocking the nickel-testing passage except when responding to coins of proper diameter and sufficient weight for the nickel coin passage but maintaining said intersection against passage of dimes and coins of similar insufficient diameter for direction into the dime-testing passage.

11. In a coin selector, means forming a coin-receiving passage for coins of several diameters, means forming a plurality of testing passages each for a different diameter of coin and communicating with said coin-receiving passage, a swinging gate having a plurality of runways for supporting coins in said coin-testing passages in one position of the gate and for releasing said coins in another position of the gate, and deflecting means in the coin-receiving passage for selectively delivering coins of a given diameter to one coin-receiving passage and to by-pass smaller coins to another coin-receiving passage.

12. In a coin selector, means forming a coin-receiving passage for coins of several diameters, means forming a plurality of testing passages each for a different diameter of coin and communicating with said coin-receiving passage, a swinging gate having a plurality of runways for supporting coins in said coin-testing passages in one position of the gate and for releasing said coins in another position of the gate, deflecting means in the coin-receiving passage for directing coins of a given diameter to one coin-receiving passage and to by-pass smaller coins to another coin-receiving passage, said deflecting means being adapted to stop certain spurious coins.

13. In a coin selector, means forming a coin-receiving passage for coins of several diameters, means forming a plurality of testing passages each for a different diameter of coin and communicating with said coin-receiving passage, a swinging gate having a plurality of runways for supporting coins in said coin-testing passages in one position of the gate and for releasing said coins from the coin-testing passages in another position of the gate, deflecting means in the coin-receiving passage for directing coins of a given diameter to one coin-receiving passage and to by-pass smaller coins to another coin-receiving passage, said deflecting means being adapted to stop certain spurious coins, means for releasing coins in all passages, and means for simultaneously scavenging the several coin-selecting passages.

14. A coin selector comprising a wall forming part of a coin passage, a swinging gate on one side of the wall movable to and from said wall, a runway for coins on said gate which supports coins in said passage when the gate is near the wall, means for opening the gate to withdraw the runway, a swinging member on the other side of the wall movable to and from said wall and forming another coin passage, a coin runway on said swinging member which supports coins when the member is near the wall, and means connecting the swinging gate with the swinging member whereby when the gate is shut to place its runway into coin-holding position, said swinging member is moved so that its runway is in coin-holding position.

15. A coin selector comprising a wall forming parts of first and second coin passages, a swinging gate movable to and from said wall, a plurality of runways for coins on said gate which support coins when the gate is near the wall and tend to drop them when the gate is swung open, means forming a coin-receiving passage communicating with said passages, means for deflecting coins of a given size and weight to the first one of the said passages and to direct coins of lesser size to the second one of said passages, a swinging member on the other side of the wall forming a third coin passage, deflecting means at the second gate passage for directing to said second passage coins of predetermined size and weight and directing the smaller coins to said third coin passage.

16. A coin selector comprising a wall forming parts of two coin passages, a swinging gate movable to and from said wall, a plurality of runways for coins on said gate which support coins when the gate is near the wall and tend to drop them when the gate is swung open, means forming a coin-receiving passage communicating with said two passages, means for deflecting coins of a given size and weight to the first one of the said passages and to by-pass coins of lesser size to the second one of said passages, a swinging member on the other side of the wall forming a third passage, deflecting means at the second passage for delivering to said second passage coins of predetermined size and weight and by-passing smaller coins to said third passage, means interconnecting the gate and said swinging member whereby when the gate is swung away from said wall said swinging member also assumes a position away from said wall whereby coins may be dropped out of all of said passages.

17. A coin selector comprising a wall forming parts of two coin passages, a swinging gate movable to and from said wall, a plurality of runways for coins on said gate which support coins when the gate is near the wall and tend to drop them when the gate is swung open, means forming a coin-receiving passage communicating with said passages, means for deflecting coins of a given size and weight to the first one of said passages and to by-pass coins of lesser size to the second one of said passages, a swinging member on the other side of the wall providing a third coin passage communicating with said coin-receiving passage, deflecting means at the second passage for delivering to said second passage coins of predetermined size and weight and by-passing smaller coins to said third passage, means interconnecting the gate and said swinging member whereby when the gate is swung away from said wall said swinging member also assumes a position away from said wall whereby coins may be dropped out of all three of said passages, and scavening means operable by a single motion to open the gate and to scavenge all coin passages.

18. A coin selector comprising a wall forming parts of coin passages, a swinging gate movable to and from said wall, a plurality of runways for coins on said gate which support coins when the gate is near the wall and tend to drop them when the gate is swung open, means forming a coin-receiving passage communicating with said gate passages, means for deflecting coins of a given size and weight to a first one of the passages and to by-pass coins of lesser size to the second one of said passages, a swinging member on the other side of the wall providing with the wall a third coin passage communicating with said coin-receiving passage, deflecting means at the second passage for delivering to said second passage coins of predetermined size and weight and by-passing the smaller coins to said third coin passage in the swinging member, means interconnecting the gate and said swinging member whereby when the gate is swung away from said wall said swinging member also assumes a position away from said wall whereby coins may be dropped out of all three of said passages, a scavening bar movable into the first and second passages and adapted to move the gate to open position, a second scavenging bar movable to scavenge the third passage, said second scavenger having articulation with the first scavenging member.

19. In a coin selecting apparatus of the character described having a coin pathway and means affixed to the said selecting apparatus operatively related to said pathway for separating coins of acceptable diameters from coins of lesser diameters, comprising a swingable gauging means having two integral abutments in fixed relation with each other extending into said pathway, positioning means affixed to said gauging means for resiliently urging said abutments into normal position, said abutments adapted to engage the edge of a coin of acceptable diameter when said coin is deposited under the influence of gravity in said pathway to swing said gauging means against the restraining action of the aforesaid positioning means to divert said coin from said pathway, said abutments positioned to pass therethrough a coin of lesser diameter deposited in said pathway, to separate coins of acceptable diameters from coins of lesser diameters.

20. In a coin selecting apparatus of the character described a coin pathway, a displaceable gauging means operatively related to said pathway for separating coins of acceptable diameters from coins of lesser diameters, comprising a swingable pivotally mounted gauge having two integral abutments in fixed relation with each other normally extending into said pathway, said gauge pivotally mounted upon a gauge retainer, said retainer yieldably positioned upon the said selecting apparatus and adapted to be laterally displaced from said pathway, positioning means affixed to said gauge for resiliently urging said abutments into normal position, said abutments adapted to be withdrawn from said pathway upon the displacement of said retainer, said abutments of said gauge adapted to engage the edge of a coin of acceptable diameter when said coin is deposited under the influence of gravity in said pathway to swing said gauge against the restraining action of the aforesaid positioning means to divert said coin from said pathway, said abutments positioned to pass therethrough in a separate path a coin of lesser diameter deposited in said pathway, to separate coins of acceptable diameters from coins of lesser diameters and to scavenge said pathway.

21. The combination in a coin selecting apparatus of the character described for separating undersized coins from coins having predetermined acceptacle diameters of a frame having a coin receiving pathway, a connecting coin rejection pathway, a connecting coin acceptance pathway, a pivotally mounted member having a pair of integral spaced projections normally extending into said coin receiving pathway, means adapted to yieldably urge said projections into a normal position, said member swingably secured to a movable retainer, said retainer yieldably positioned to the said frame adjacent to said receiving pathway and adapted to be laterally displaced from said frame to withdraw said projections from said receiving pathway, said pair of projections spaced in relation to encounter the edge of a coin of acceptable diameter propelled by gravity in said receiving pathway to swing said member to divert said coin into said acceptance pathway, said projections arranged to by-pass therebetween a coin propelled by gravity in said receiving pathway having a diameter less than a coin of acceptable diameter, to separate undersized coins from coins having acceptable diameters and to scavenge said pathways.

22. In a coin selecting apparatus of the character described having a coin receiving pathway, a connecting acceptance pathway for receiving coins of predetermined diameters, and a connecting rejection pathway for receiving coins having diameters less than the said coins of predetermined diameters, a pivotally mounted gauging means having a predetermined opening therethrough positioned in said receiving pathway, whereby a coin having a predetermined acceptable diameter deposited in said coin receiving pathway propelled by gravity will impinge upon and rotate said gauging means to divert said coin into said acceptance pathway, including means for restoring said gauging means to its normal inactive position, said gauging means adapted to by-pass a coin, propelled by gravity, having a diameter less than said coin of predetermined diameter through said opening in said gauging means into the said rejection pathway, to separate coins having predetermined acceptable diameters from coins having lesser diameters.

23. In a coin selector for separating spurious coins from acceptable coins and also sorting coins of different diameters, a single entrance pathway means, a predetermined plurality of testing pathway means, each said testing pathway means joining said first-mentioned means at a junction connecting with said entrance pathway means, each said testing means adapted to receive coins of a single predetermined diameter, diameter gauging means positioned at each said junction corresponding with each said testing pathway means, a rejection conducting means connecting with said entrance pathway means and said plurality of testing pathway means for conducting spurious coins in one direction, whereby coins of predetermined diameters which are deposited and propelled by gravity in said entrance pathway means will encounter their corresponding gauging means and be sorted in accordance with their diameters and directed into their corresponding testing pathway means, and whereby spurious coins deposited and propelled by gravity in the said entrance pathway means will be rejected either by said gauging means or said testing pathways, dependent upon their physical properties, and then conducted to said rejection conducting means, to sort coins of predetermined diameters and to separate spurious coins therefrom.

24. In a coin selector for separating spurious coins from acceptable coins and also sorting coins of different diameters, a single entrance pathway means, a predetermined plurality of testing pathway means, each said testing pathway means joining said first-mentioned means at a junction connecting with said entrance pathway means, each said testing means adapted to receive coins of a single predetermined diameter, diameter gauging means positioned at each said junction corresponding with each said testing pathway means, a rejection conducting means connecting with said entrance pathway means and said plurality of testing pathway means for conducting spurious coins in one direction, including coin clearing means operatively connected with said entrance pathway means and said plurality of testing pathway means, whereby coins of predetermined diameters which are deposited and propelled by gravity in said entrance pathway means will encounter their corresponding gauging means and be sorted in accordance with their diameters and directed into their corresponding testing pathway means, whereby spurious coins deposited and propelled by gravity in the said entrance pathway means will be rejected either by said gauging means or said testing pathways, dependent upon their physical properties, and then conducted to said rejection conducting means, and whereby the operation of said clearing means will dislodge any coin arrested in said pathway means into said rejection conducting means, to sort coins of predetermined diameters, to separate spurious coins therefrom, and to clear coins suspended in said coin selector.

BENJAMIN W. FRY.